United States Patent
Kim et al.

(10) Patent No.: US 7,652,955 B2
(45) Date of Patent: Jan. 26, 2010

(54) AUDIO ENCODING METHOD AND APPARATUS FOR ELECTRONIC SHOCK PROTECTION FUNCTION IN AUDIO PLAYER

(75) Inventors: Dohyung Kim, Hwaseong-si (KR); Junghoe Kim, Seoul (KR); Shihwa Lee, Seoul (KR); Sangwook Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 854 days.

(21) Appl. No.: 11/126,258

(22) Filed: May 11, 2005

(65) Prior Publication Data

US 2005/0256708 A1    Nov. 17, 2005

(30) Foreign Application Priority Data

May 12, 2004    (KR) .................. 10-2004-0033644

(51) Int. Cl.
G11B 7/085    (2006.01)
(52) U.S. Cl. ............. 369/30.23; 369/30.24; 369/47.16; 369/47.34; 369/59.25
(58) Field of Classification Search ... 369/30.23–30.24, 369/47.16, 47.34, 59.25; 704/229; 709/250
See application file for complete search history.

(56) References Cited

U.S. PATENT DOCUMENTS

| | | | | |
|---|---|---|---|---|
| 5,453,964 A | | 9/1995 | Shimizume | 369/48 |
| 5,654,949 A | | 8/1997 | Nonaka et al. | 369/60 |
| 5,708,637 A | * | 1/1998 | Umemura et al. | 369/47.34 |
| 5,751,951 A | * | 5/1998 | Osborne et al. | 709/250 |
| 5,818,801 A | * | 10/1998 | Watanabe et al. | 369/30.23 |
| 7,149,167 B2 | * | 12/2006 | Hayashi et al. | 369/47.34 |
| 2002/0196714 A1 | * | 12/2002 | Tada et al. | 369/30.12 |

FOREIGN PATENT DOCUMENTS

| | | |
|---|---|---|
| DE | 10053732 | 5/2001 |
| EP | 1102207 | 5/2001 |
| FR | 2802695 | 6/2001 |
| KR | 10-2000-0064279 | 11/2000 |
| KR | 10-2001-0028736 | 4/2001 |
| WO | WO 2004/051645 | 6/2004 |

* cited by examiner

Primary Examiner—Joseph H Feild
Assistant Examiner—Ifedayo Iluyomade
(74) Attorney, Agent, or Firm—Staas & Halsey LLP

(57) ABSTRACT

An audio encoding method and apparatus for electronic shock protection (ESP) function in an audio player. A method of generating a frame structure for an electronic shock protection function of an audio player, includes: encoding original data of a frame and locating the encoded data in a first area that is a start part of the frame structure; and encoding frame length information indicating a size of the encoded data in the frame, and locating the encoded frame length information in a second area that is an end part of the frame structure.

14 Claims, 5 Drawing Sheets

AUDIO ENCODING METHOD AND APPARATUS FOR ELECTRONIC SHOCK PROTECTION FUNCTION IN AUDIO PLAYER

CROSS-REFERENCE TO RELATED APPLICATION

This application claims the priority of Korean Patent Application No. 2004-0033644, filed on May 12, 2004, in the Korean Intellectual Property Office, the disclosure of which is incorporated herein by reference.

BACKGROUND OF THE INVENTION

1. Field of the Invention

The present invention relates to an audio player having an electronic shock protection (ESP) function, and more particularly, to an audio encoding method and apparatus by which when encoding audio data read from a compact disc (CD) is performed before storing the data, if a shock occurs, a point for linking valid audio data in a buffer can be accurately found and encoding is performed irrespective of whether the encoding rate of the audio data is a constant bit rate or a variable bit rate.

2. Description of Related Art

Recording media such as a CD and a DVD are widely used to store audio files because of their relatively low prices and large capacities. By using one audio player, a user reproduces an audio file, such as an MP3, WMA, or AAC file, encoded and recorded on a CD. In particular, in the case of a portable audio player or a car CD player, a protection against external shock should be provided for seamless reproduction. For this, usually a mechanical buffer or an external electronic shock protection (ESP) chipset is used. The ESP function is to output clean sound even when there is an external shock, and not to remove noise caused by a scratched or contaminated CD.

A conventional ESP function will now be explained with reference to FIGS. 1A through 1F. As shown in FIG. 1A, if an external shock occurs in a fifth frame, a servo becomes unstable and noise occurs continuously in the fifth, sixth, and seventh frames. As shown in FIG. 1B, until the servo becomes stable, audio data of frames in which noise occurs is stored in a buffer. As shown in FIG. 1C, a pattern unique to a frame in the fourth frame is selected and data after the unique pattern is discarded. As shown in FIG. 1D, the CD is rewound to the start point of the fourth frame and then audio data is read from the fourth frame, and the unique pattern to the fourth frame is found. As shown in FIG. 1E, immediately after the location where the unique pattern of the fourth frame is in the buffer, new audio data beginning from the fifth frame is linked and stored. As a result, as shown in FIG. 1F, noiseless audio data is stored in the buffer and even when a shock occurs, seamless clean sound can be output.

If the conventional ESP function as described above is set in an audio player, in a normal mode in which a shock does not occur, an audio output is generated directly from data read from a CD and provided to the user, and in an abnormal mode in which a shock occurs, an audio output is generated from data provided from the buffer and provided to the user. However, this conventional ESP function cannot perform its function when an external shock lasts for a long while exceeding a shock protection time. In order to extend a shock protection time, audio data read from a CD is encoded before stored. In this case, the shock protection time can vary depending on the size of a buffer and the encoding rate of data.

At present, when audio encoding suggested by MPEG-1 and MPEG-2 is performed, if a constant bit rate is employed, sync information is placed at the start part of each frame, and in case of MPEG-4, if the constant bit rate is not used, frame length information is placed at the start part of each frame. Accordingly, when a shock occurs and valid data is desired to be linked in the buffer, if the encoding rate is a constant bit rate, the length of each frame, that is, an occupying area in the buffer, is constant such that an area storing a frame before the frame in which a shock occurs can be easily found. However, if the encoding rate is a variable bit rate, the length of each frame, that is, the size of an occupying area in the buffer, is different to each other such that an area storing a frame before the frame in which a shock occurs cannot be found only with the frame length information recorded in the start part of each frame in the buffer

BRIEF SUMMARY

An aspect of the present invention provides an audio encoding method and apparatus by which when encoding audio data read from a CD is performed before storing the data, if a shock occurs, a point for linking valid audio data in a buffer can be accurately found and encoding is performed irrespective of whether the encoding rate of the audio data is a constant bit rate or a variable bit rate.

According to an aspect of the present invention, there is provided a method of generating a frame structure for an electronic shock protection function of an audio player, including: encoding original data of a frame and locating the encoded data in a first area that is a start part of the frame structure; and encoding frame length information indicating a size of the encoded data in the frame, and locating the encoded frame length information in a second area that is an end part of the frame structure.

According to another aspect of the present invention, there is provided a method of generating a frame structure for an electronic shock protection function of an audio player, including: locating sync information indicating the start of a frame in a first area that is a start part of the frame structure; encoding original data of the frame and locating the encoded data in a second area that is next to the first area; and encoding frame length information indicating a size of the encoded data in the frame, and locating the encoded frame length information in a third area that is an end part of the frame structure.

According to still another aspect of the present invention, there is provided an audio encoding method using an encoded frame structure stored in a buffer and including frame length information in an end part of the frame structure, in an audio player having an electronic shock protection function in which a number of frames to be rewound when a shock occurs in the audio player is k, the method including: confirming the frame length information of a (t−k)-th frame that is located k frames before a t-th frame in which the shock occurs, from the buffer; confirming, by performing a backward seek in the buffer using the confirmed frame length information, an address at which the (t−k)-th frame begins; and sequentially writing audio data from the (t−k)-th frame read again from a recording medium and encoded, in the buffer from the address at which the (t−k)-th frame begins.

According to yet still another aspect of the present invention, there is provided an audio encoding method using an encoded frame structure stored in a buffer and including sync information in a start part of the frame structure and frame length information in an end part of the frame structure, in an audio player having an electronic shock protection function in which a number of frames to be rewound when a shock occurs in the audio player is k, the method including: confirming the frame length information of a (t−k)-th frame that is located k frames before a t-th frame in which the shock occurs, from the buffer; confirming, by performing a backward seek in the buffer by using the confirmed frame length information, an address at which the (t−k)-th frame begins; confirming sync information written in the address at which the (t−k)-th frame begins; and sequentially writing audio data from the (t−k)-th frame read again from a recording medium and encoded, in the buffer from the address at which the (t−k)-th frame begins.

According to a further aspect of the present invention, there is provided an encoding apparatus in an audio player having an electronic shock protection function in which a number of frames to be rewound from a t-th frame in which a shock occurs in the audio player is k, the apparatus including: an encoding unit which encodes audio data read from a recording medium and generates a frame structure formed by sequentially combining encoded data and frame length information; a buffer unit which temporarily stores encoded frame data provided by the encoding unit; and a control unit which: confirms the frame length information of a (t−k)-th frame in the buffer unit; by using the confirmed frame length information, confirms an address at which the (t−k)-th frame begins; and sequentially writes, from the address at which the (t−k)-th frame begins, audio data from the (t−k)-th frame read again from the recording medium and encoded.

According to an additional aspect of the present invention, there is provided an encoding apparatus in an audio player having an electronic shock protection function in which a number of frames to be rewound from a t-th frame in which a shock occurs in the audio player is k, the apparatus including: an encoding unit which encodes audio data read from a recording medium and generates a frame structure formed by sequentially combining encoded data and frame length information; a buffer unit which temporarily stores encoded frame data provided by the encoding unit; and a control unit which: confirms the frame length information of a (t−k)-th frame in the buffer unit; by using the confirmed frame length information, confirms an address at which the (t−k)-th frame begins; confirms sync information written in the address at which the (t−k)-th frame begins, and sequentially writes, from the address at which the (t−k)-th frame begins audio data from the (t−k)-th frame read again from the recording medium and encoded.

According to an additional aspect of the present invention, there is provided a computer readable recording medium having embodied thereon a computer program for the above methods.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1A:
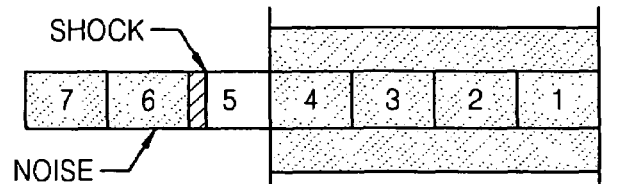
FIGS. 1A through 1F are diagrams illustrating the concept of conventional electronic shock protection (ESP)
Figure 1B:
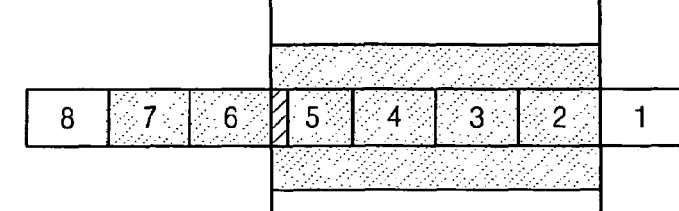
Figure 1C:
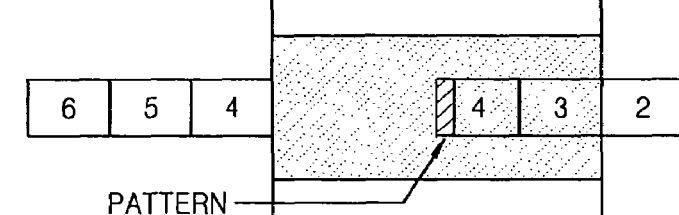
Figure 1D:
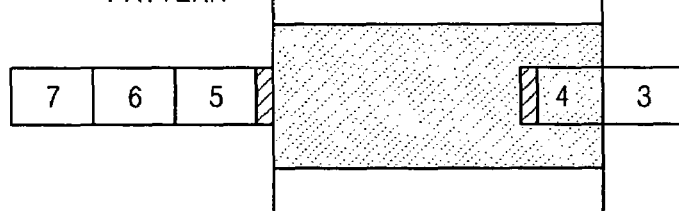
Figure 1E:
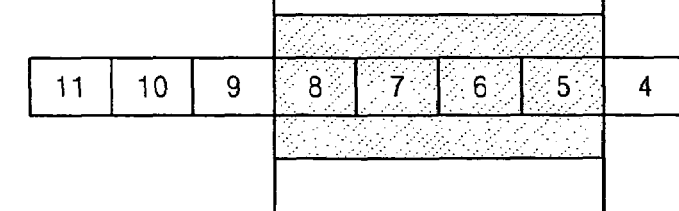
Figure 1F:
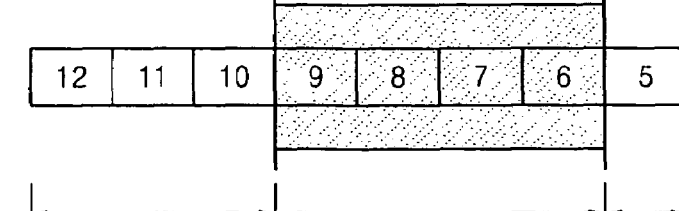

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
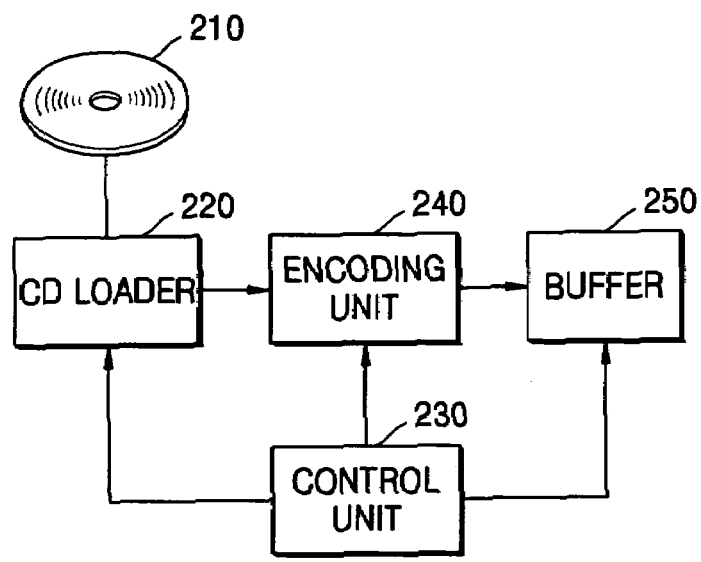
FIG. 2 is a block diagram showing the structure of an audio encoding apparatus according to an embodiment of the present invention.

Referring to FIG. 2, an audio encoding apparatus according to an embodiment of the present invention includes a CD 210, a CD loader 220, a control unit 230, an encoding unit 240, and a buffer 250. Here, an operation when an ESP function is set irrespective of whether an electronic shock protection (ESP) function is automatically set or manually set by a user, will now be explained.

Referring to FIG. 2, the CD loader 220 includes a servo (not shown) and a pickup (not shown), and drives the CD 210 under the control of the control unit 230. The CD loader 220 reads audio data stored in a specified sector of the CD 210 and provides the read audio data to the encoding unit 240. The data provided by the CD 210 is usually pulse code modulation (PCM) data and is provided with containing M:S:F information. Here, F denotes a frame, S denotes a second, and a second is formed with, for example, 75 Fs. M denotes a minute and one minute is formed with 60 Ss.

If M:S:F information is used, an absolute location indicating a location which corresponding audio data is recorded on can be identified.

The control unit 230 performs control of an overall ESP function and is usually formed with a digital signal processor (DSP). In a normal mode in which a shock does not occur in the CD 210, the control unit 230 controls to generate a valid signal and provide the signal to the CD loader 220 and the encoding unit 240 such that encoding is performed according to a preset encoding procedure and encoded data is stored in the buffer unit 250. In an abnormal mode in which a shock occurs in the CD 210, the control unit 230 generates an invalid signal and provides the signal to the CD loader 220 and the encoding unit 240. According to this, when the mode is changed to an abnormal, a normal encoding procedure of the encoding unit 240 is stopped and the CD loader 220 is controlled to move the pickup to a frame a specified number of frames before the frame in which a shock occurs, again read audio data, and encode audio data in a frame after a specified location. That is, in an abnormal mode, the control unit 230 receives absolute location information (that is, F:S:M information) in the CD 210 of a frame, for example, a t-th frame, for which encoding is currently performed in the encoding unit 240 at a time when a shock occurs, and information on the last address of the (t−1)-th frame recorded into the buffer unit 250 from the encoding unit 240 immediately before the t-th frame. Then, the control unit 230 controls the CD loader 220 such that the pickup is moved from the t-th frame to the (t−k)-th frame that is preset k frames before the t-th frame, and data is read from the CD 210. Here, in the abnormal mode, the value k, indicating the number of frames to be rewound by the pickup from a frame in which a shock occurs, can be set when an audio player having an ESP function is designed or can be manually set by a user. Meanwhile, the value k can also be automatically set in proportion to a time from the occurrence of a shock to stabilization of the servo.

In a normal mode, the encoding unit 240 performs encoding sequentially in units of frames, and provides encoded data to the buffer unit 250. At this time, the encoding unit 240 stores the last address of a frame which is stored latest in the buffer unit 250, and stores data of a frame for which encoding is currently completed, from an address immediately after the last address. In an abnormal mode in which a shock occurs, the encoding operation is stopped during a specified time from sensing the shock to stabilization of the servo, according to control of the control unit 230. Meanwhile, if audio data is read from a frame in the CD 210, k frames before the frame in which the shock occurs, after the servo is stabilized, the audio data is sequentially encoded and provided to the buffer unit 250.

The buffer unit 250 is formed with, for example, a 16M DRAM buffer, and stores the data encoded in the encoding unit 240, in a specified area according to control of the control unit 230. In a normal mode in which a shock does not occur, a data writing operation is repeatedly performed such that audio data corresponding to a specified number of frames is filled and then, audio data corresponding to a next specified number of frames is filled again and again. Meanwhile, in an abnormal mode in which a shock occurs, the data writing operation is stopped during a specified time taken from sensing the shock to stabilization of the servo, according to control of the control unit 230. Meanwhile, after the servo is stabilized, audio data in a frame in a specified location in the CD 210 before the frame in which the shock occurs, is read and encoded, and the encoded data is written again from an address from which a frame in a specified location is stored in the buffer unit 250. Thus, accurately connecting the t-th frame formed with valid data again read from the CD 210, to immediately after the (t−1)-th frame formed with valid data for which writing operation is completed previously, in the buffer unit 250 is performed by control of the control unit 230. In the buffer unit 250, encoded data and frame length information can be sequentially written in units of frames, or sync information, and encoded data and frame length information can be sequentially written in units of frames.

Figure 3:
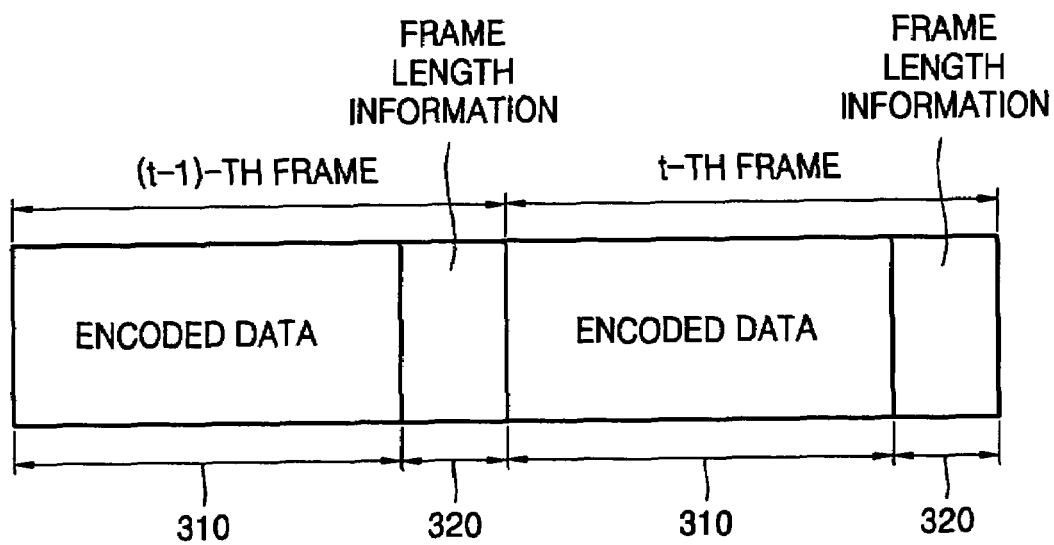
FIG. 3 is a diagram of an example of a frame structure generated in an encoding unit of the audio encoding apparatus of FIG. 2.

FIG. 3 is a diagram of an example of a frame structure finally generated in the encoding unit 240 of the audio encoding apparatus of FIG. 2. The frame structure will be explained with reference to FIGS. 2 and 3 and includes a first area 310 and a second area 320 in each frame in the buffer unit 250. That is, the frame structure generated in the encoding unit 240 is formed with encoded data located in the first area 310 of the frame, and encoded frame length information located in the second area 320. Here, the size of the second area 320 is constant in all frames, and the size of the first area 310 can vary depending on the encoding rate of a frame.

Figure 4:
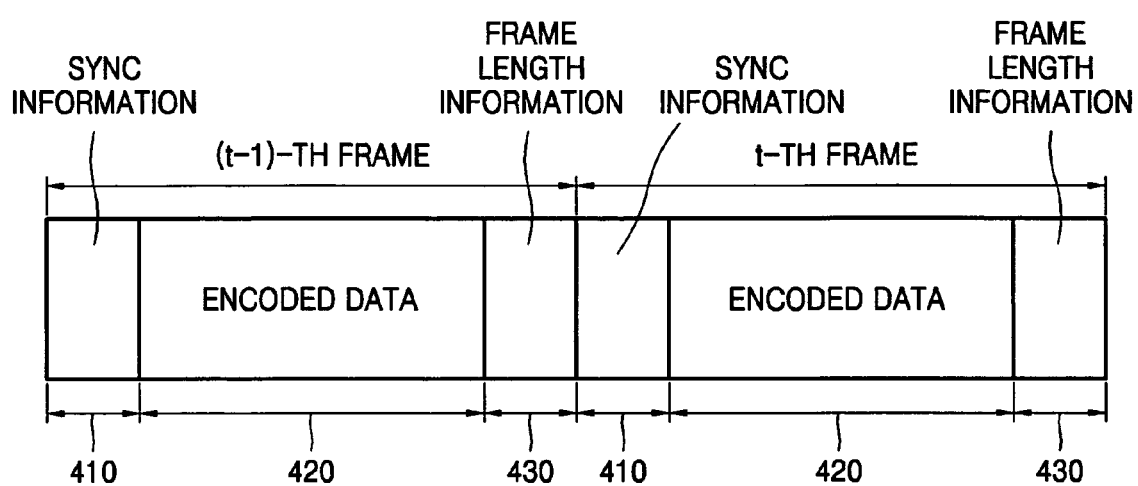
FIG. 4 is a diagram of another example of a frame structure generated in an encoding unit of the audio encoding apparatus of FIG. 2.

FIG. 4 is a diagram of another example of a frame structure finally generated in the encoding unit 240 of the audio encoding apparatus of FIG. 2. The frame structure will be explained with reference to FIGS. 2 and 4 and includes a first area 410, a second area 420, and a third area 430 in each frame in the buffer unit 250. That is, the frame structure generated in the encoding unit 240 is formed with sync information located in the first area 410 of the frame, encoded data located in the second area 420, and encoded frame length information located in the third area 430. Here, the sizes of the first area 410 and the third area 430 are constant in all frames, and the size of the second area 420 can vary depending on the encoding rate of a frame. Thus, when a frame structure is generated by including sync information, the reliability and accuracy in a backward seek operation can be further enhanced.

Figure 5:
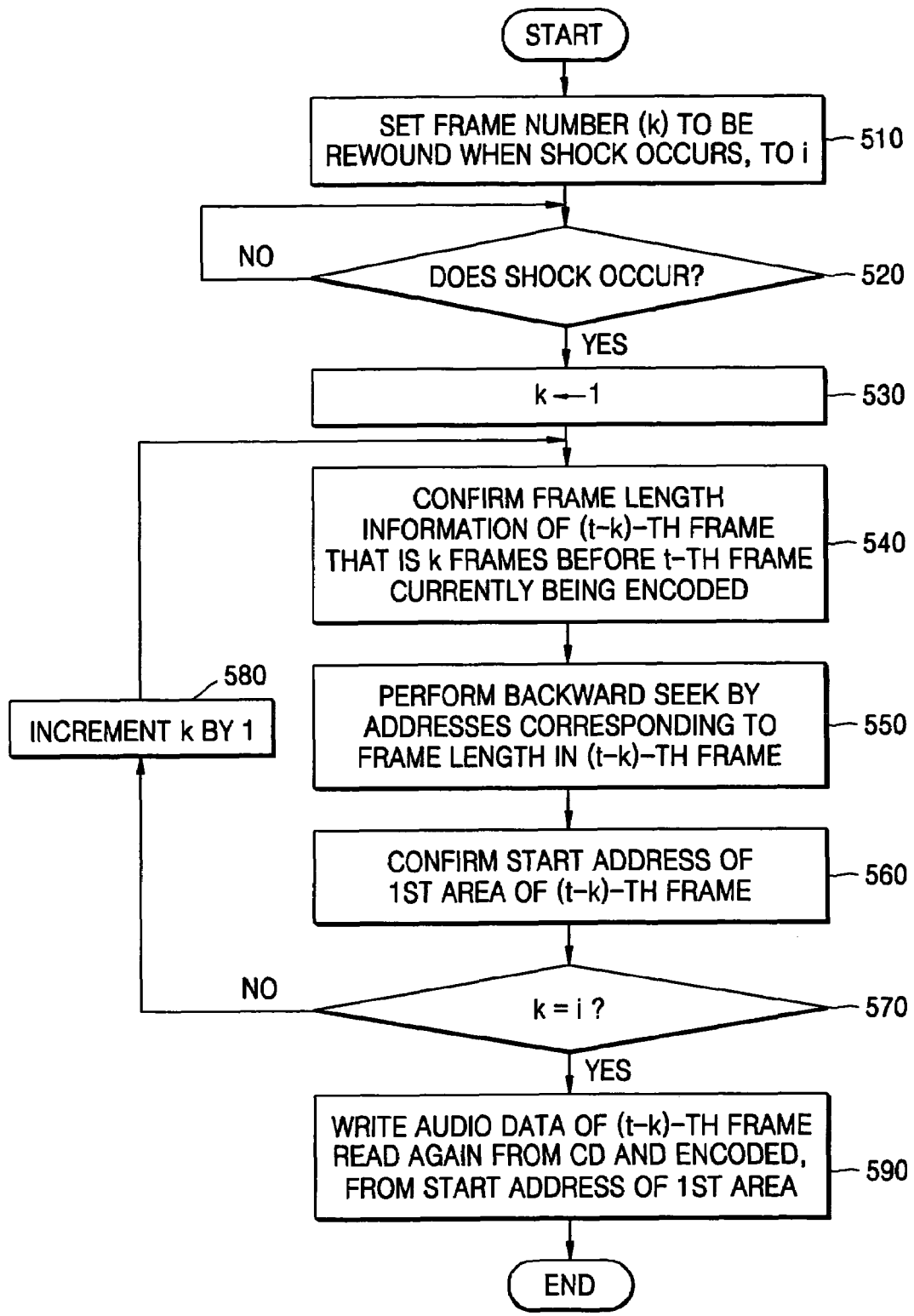
FIG. 5 is a flowchart illustrating an audio encoding method according to an embodiment of the present invention.

FIG. 5 is a flowchart illustrating an audio encoding method according to an embodiment of the present invention, and corresponds to a case using the frame structure in FIG. 3.

Referring to FIGS. 2, 3, and 5, the frame number (k) to be rewound in the CD 210 in an abnormal mode is set to i in operation 510. In operation 520, whether or not a shock occurs in the audio player is continuously monitored. As a method to monitor whether or not a shock occurs in the audio player, a method used in a conventional ESP system is usable.

In operation 530, if the monitoring results in operation 520 indicates that a shock occurs, k is set to 1. In operation 540, the address in the buffer unit 250 of a frame before a current frame, for example, a t-th frame, being currently encoded in the encoding unit 240, is confirmed, that is, the address of the (t−k)-th frame is confirmed, and the frame length information of the (t−k)-th frame stored in the confirmed address of the buffer unit 250 is confirmed. If the frame length information is identified, the size occupied by the first area 310 in which data encoded in the (t−1)-th frame is located can be identified.

In operation 550, backward seek is performed for addresses corresponding to the frame length from the address of an area in which the frame length information is stored in the (t−k)-th frame, and as a result, confirms the start address of the first area 310 of the (t−k)-th frame in operation 560.

In operation 570, it is determined whether or not k is i, and if k is not i, k is incremented by 1 in operation 580, and the method returns to operation 540, and operations 540 through 570 are performed again. Conversely, if k is i, in operation 590, the audio data of the (t−k)-th frame again read from the CD 210 and encoded is sequentially written from the start address of the first area 310 confirmed in operation 560.

Figure 6:
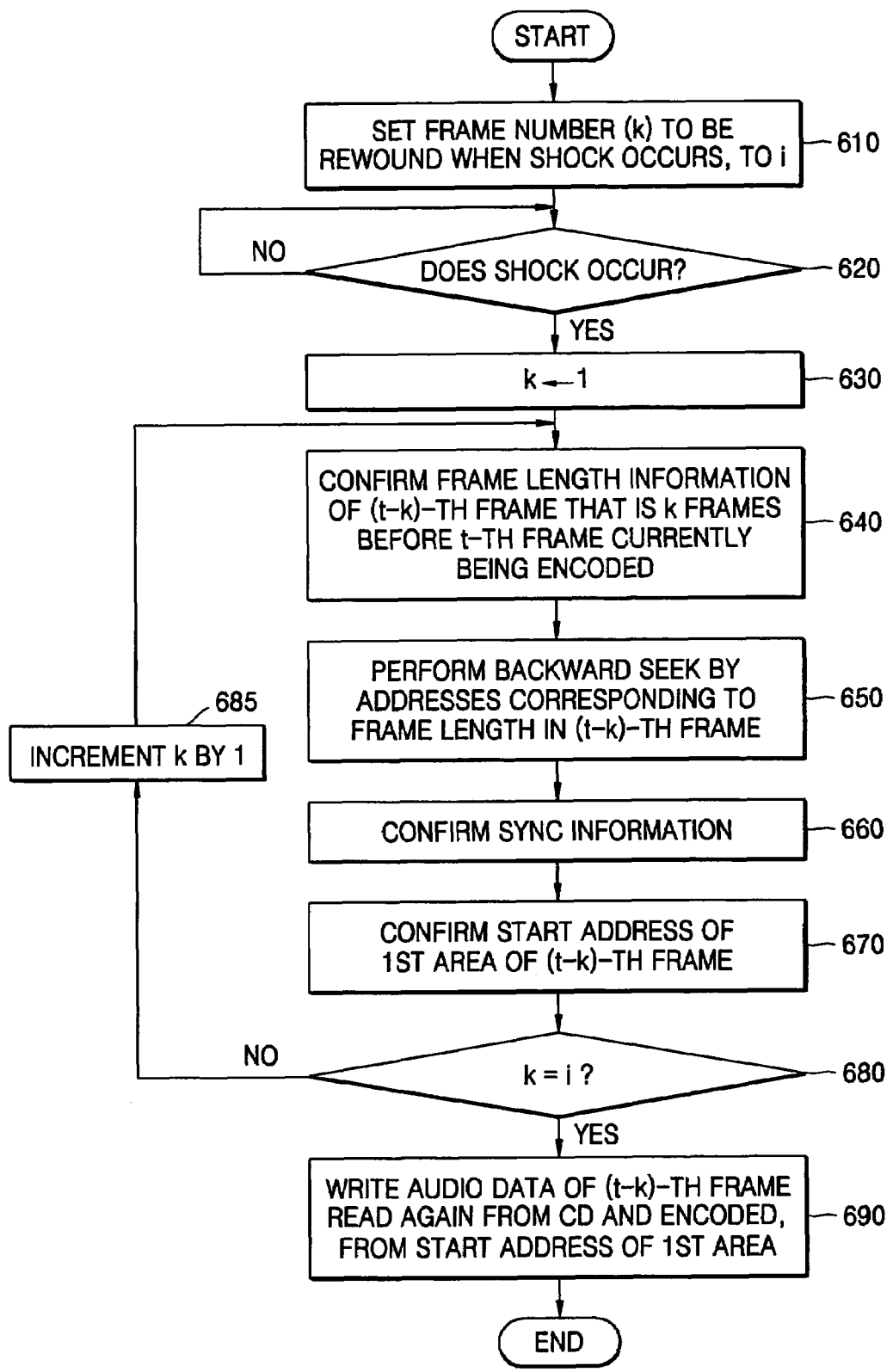
FIG. 6 is a flowchart illustrating an audio encoding method according to another embodiment of the present invention.

FIG. 6 is a flowchart illustrating an operation of an audio encoding method according to another embodiment of the present invention, and corresponds to a case using the frame structure in FIG. 4.

Referring to FIGS. 2, 4 and 6, the frame number (k) to be rewound in the CD 210 in an abnormal mode is set to i in operation 610. In operation 620, whether or not a shock occurs in the CD 210 is continuously monitored.

In operation 630, if the monitoring results in operation 620 indicates that a shock occurs, k is set to 1. In operation 640, the address in the buffer unit 250 of a frame before a current frame, for example, a t-th frame, being currently encoded in the encoding unit 240, is confirmed, that is, the address of the (t−k)-th frame is confirmed, and the frame length information of the (t−k)-th frame stored in the confirmed address of the buffer unit 250 is confirmed. If the frame length information is identified, the size occupied by the second area 420 in which data encoded in the (t−1)-th frame is located can be identified.

In operation 650, backward seek is performed for addresses corresponding to the frame length from the address of an area in which the frame length information is stored in the (t−k)-th frame. In operation 660, sync information located in the start part of the first area 410 of the (t−k)-th frame is confirmed, and the start address of the first area 410 of the (t−k)-th frame is confirmed in operation 670.

In operation 680, it is determined whether or not k is i, and if k is not i, k is incremented by 1 in operation 685, and the method returns to operation 640 and operations 640 through 680 are performed again. Conversely, if k is i, in operation 690, the audio data of the (t−k)-th frame again read from the CD 210 and encoded is sequentially written from the start address of the first area 410 confirmed in operation 670.

That is, according to the above-described embodiments of the present invention, if k is 1, since the encoding unit 240 stores the last address of the (t−1)-th frame that is stored latest in the buffer unit 250, by using the frame length information stored in the last address, the start address of the (t−1)-th frame can be found. Conversely, if k is equal to or greater than 1, for example, 2, by using the (t−1)-th frame length information, backward seek is performed to confirm the start address of the (t−1)-th frame, and by using the start address of the (t−1)-th frame, the frame length information of the (t−2)-th frame located at an address immediately before the (t−1)-th frame can be confirmed. Then, by using the (t−2)-th frame length information, backward seek is performed and the start address of the (t−2)-th frame can be found.

Though the CD is used as an example of a recording medium in the embodiments described above, it is to be understood that the above-described embodiments of the present invention can be applied to a variety of other media, such as, by way of non-limiting examples, a DVD, HDD, and a Blue-ray Disk (BD).

The above-described embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to above-described embodiments of the present invention, when encoding audio data read from a compact disc (CD) is performed before storing the data, if a shock occurs, a point for linking valid audio data in a buffer can be accurately found and encoding is performed irrespective of whether the encoding rate of the audio data is a constant bit rate or a variable bit rate.

Accordingly, the shock protection time can be extended because of the encoding, and in addition, when a shock occurs, clean sound can be provided to users during the shock protection time irrespective of an encoding rate.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An audio encoding method using an encoded frame structure stored in a buffer and including frame length information in an end part of the frame structure, in an audio player having an electronic shock protection function in which a number of frames to be rewound when a shock occurs in the audio player is k, the method comprising:
   confirming the frame length information of a (t−k)-th frame that is located k frames before a t-th frame in which the shock occurs, from the buffer;
   confirming, by performing a backward seek in the buffer using the confirmed frame length information, an address at which the (t−k)-th frame begins; and
   sequentially writing audio data from the (t−k)-th frame read again from a recording medium and encoded, in the buffer from the address at which the (t−k)-th frame begins.

2. The method of claim 1, wherein the encoded data included in the frame is encoded at a constant bit rate.

3. The method of claim 1, wherein the encoded data included in the frame is encoded at a variable bit rate.

4. An audio encoding method using an encoded frame structure stored in a buffer and including sync information in a start part of the frame structure and frame length information in an end part of the frame structure, in an audio player having an electronic shock protection function in which a number of frames to be rewound when a shock occurs in the audio player is k, the method comprising:
   confirming the frame length information of a (t−k)-th frame that is located k frames before a t-th frame in which the shock occurs, from the buffer;
   confirming, by performing a backward seek in the buffer by using the confirmed frame length information, an address at which the (t−k)-th frame begins;
   confirming sync information written in the address at which the (t−k)-th frame begins; and
   sequentially writing audio data from the (t−k)-th frame read again from a recording medium and encoded, in the buffer from the address at which the (t−k)-th frame begins.

5. The method of claim 4, wherein the encoded data included in the frame is encoded at a constant bit rate.

6. The method of claim 4, wherein the encoded data included in the frame is encoded at a variable bit rate.

7. An encoding apparatus in an audio player having an electronic shock protection function in which a number of frames to be rewound from a t-th frame in which a shock occurs in the audio player is k, the apparatus comprising:
   an encoding unit which encodes audio data read from a recording medium and generates a frame structure formed by sequentially combining encoded data followed by frame length information;
   a buffer unit which temporarily stores encoded frame data provided by the encoding unit; and
   a control unit which: confirms the frame length information of a (t−k)-th frame in the buffer unit; by using the confirmed frame length information, confirms an address at which the (t−k)-th frame begins; and sequentially writes, from the address at which the (t−k)-th frame begins, audio data from the (t−k)-th frame read again from the recording medium and encoded.

8. The apparatus of claim 7, wherein the encoded data included in the frame is encoded at a constant bit rate.

9. The apparatus of claim 7, wherein the encoded data included in the frame is encoded at a variable bit rate.

10. An encoding apparatus in an audio player having an electronic shock protection function in which a number of frames to be rewound from a t-th frame in which a shock occurs in the audio player is k, the apparatus comprising:
    an encoding unit which encodes audio data read from a recording medium and generates a frame structure formed by sequentially combining encoded data followed by frame length information;
    a buffer unit which temporarily stores encoded frame data provided by the encoding unit; and
    a control unit which: confirms the frame length information of a (t−k)-th frame in the buffer unit; by using the confirmed frame length information, confirms an address at which the (t−k)-th frame begins; confirms sync information written in the address at which the (t−k)-th frame begins, and sequentially writes, from the address at which the (t−k)-th frame begins audio data from the (t−k)-th frame read again from the recording medium and encoded.

11. The apparatus of claim 10, wherein the encoded data included in the frame is encoded at a constant bit rate.

12. The apparatus of claim 10, wherein the encoded data included in the frame is encoded at a variable bit rate.

13. A computer-readable storage medium encoded with processing instructions for causing a processor to perform an audio encoding method using an encoded frame structure stored in a buffer and including frame length information in an end part of the frame structure, in an audio player having an electronic shock protection function in which a number of frames to be rewound when a shock occurs in the audio player is k, the method comprising:
- confirming the frame length information of a (t−k)-th frame that is located k frames before a t-th frame in which the shock occurs, from the buffer;
- confirming, by performing a backward seek in the buffer using the confirmed frame length information, an address at which the (t−k)-th frame begins; and
- sequentially writing audio data from the (t−k)-th frame read again from a recording medium and encoded, in the buffer from the address at which the (t−k)-th frame begins.

14. A computer-readable storage medium encoded with processing instructions for causing a processor to perform an audio encoding method using an encoded frame structure stored in a buffer and including sync information in a start part of the frame structure and frame length information in an end part of the frame structure, in an audio player having an electronic shock protection function in which a number of frames to be rewound when a shock occurs in the audio player is k, the method comprising:
- confirming the frame length information of a (t−k)-th frame that is located k frames before a t-th frame in which the shock occurs, from the buffer;
- confirming, by performing a backward seek in the buffer by using the confirmed frame length information, an address at which the (t−k)-th frame begins;
- confirming sync information written in the address at which the (t−k)-th frame begins; and
- sequentially writing audio data from the (t−k)-th frame read again from a recording medium and encoded, in the buffer from the address at which the (t−k)-th frame begins.

\* \* \* \* \*